United States Patent
Wang et al.

(10) Patent No.: US 7,580,094 B2
(45) Date of Patent: Aug. 25, 2009

(54) TRANSREFLECTIVE LCD PANEL AND ELECTRONIC DEVICE USING THE SAME

(75) Inventors: Wen-Chun Wang, Taichung (TW); Chin-Chang Liu, Taichung County (TW); Kuo-Chang Su, Tainan County (TW)

(73) Assignee: Wintek Corporation, Taichung (TW)

( * ) Notice: Subject to any disclaimer, the term of this patent is extended or adjusted under 35 U.S.C. 154(b) by 211 days.

(21) Appl. No.: 11/902,299

(22) Filed: Sep. 20, 2007

(65) Prior Publication Data
US 2008/0074589 A1    Mar. 27, 2008

Related U.S. Application Data

(60) Provisional application No. 60/846,108, filed on Sep. 21, 2006.

(30) Foreign Application Priority Data
Jul. 23, 2007    (TW) ............................... 96126844 A

(51) Int. Cl.
*G02F 1/1335*    (2006.01)

(52) U.S. Cl. ...................... 349/108; 349/106; 349/107; 349/114

(58) Field of Classification Search ......... 349/106–108, 349/114
See application file for complete search history.

(56) References Cited

U.S. PATENT DOCUMENTS 7,336,327 B2 *    2/2008    Otagiri et al. ............... 349/106

\* cited by examiner

*Primary Examiner*—David Nelms
*Assistant Examiner*—Phu Vu
(74) *Attorney, Agent, or Firm*—Rabin & Berdo, PC

(57) ABSTRACT

A transreflective LCD panel and an electronic device using the same are provided. The LCD panel includes a first substrate and a second substrate. The second substrate is parallel to the first substrate. A liquid crystal layer is sealed between the two substrates. The first substrate includes several reflective portions. The second substrate includes a color filter structure. The color filter structure includes several color filter layers in at least four colors. Each of the color filter layers has an opening corresponding to one reflective portion. An optical filter is disposed in the opening for enhancing the coloration of the LCD panel.

25 Claims, 5 Drawing Sheets

TRANSREFLECTIVE LCD PANEL AND ELECTRONIC DEVICE USING THE SAME

This application claims the benefit of U.S. provisional application Ser. No. 60/846,108, filed Sep. 21, 2006 and Taiwan application Serial No. 96126844, filed Jul. 23, 2007, the subject matter of which is incorporated herein by reference.

BACKGROUND OF THE INVENTION

1. Field of the Invention

The invention relates in general to a transreflective LCD panel and an electronic device using the same, and more particularly to a transreflective LCD panel with high light utilization efficiency and an electronic device using the same.

2. Description of the Related Art

Generally speaking, resin color filter is coated on a substrate to form a color filter in the liquid crystal display (LCD) for displaying color images. When the LCD is turned on, the orientation and the tilting angle of liquid crystal molecules in the display panel of the LCD are controlled for adjusting the brightness of backlight passing through the liquid crystal layer. The color filter is used for filtering light and controlling the displayed color. The intensity of the backlight is adjustable anytime when the backlight source of the LCD is in the general mode. Therefore, the display effect is good in the general mode. However, the transreflective LCD turns off its backlight source when it is in the reflective mode and uses external light sources to display images. The transmission of the resin color filter is poor, and light has to pass through the color filter on the substrate twice before propagating out. This process lowers the intensity of light. Therefore, the light transmission rate of the LCD is decreased, and the reflection rate is poor. As a result, the display quality of the LCD in the reflective mode is seriously influenced.

SUMMARY OF THE INVENTION

The invention is directed to a transreflective liquid crystal display (LCD) panel and an electronic device using the same. The reflection rate of the LCD panel is increased, and the LCD panel is able to display color images in the reflective mode.

According to the present invention, a liquid crystal display panel is provided. The panel includes a first substrate, a second substrate and a liquid crystal layer. The first substrate is parallel to the second substrate. The liquid crystal layer is sealed between the first substrate and the second substrate. The first substrate includes several reflective portions. The second substrate includes a color filter structure. The color filter structure includes several color filter layers in at least four colors. Each of the color filter layers has an opening corresponding to one of the reflective portions.

According to the present invention, a liquid crystal display panel is provided. The panel includes a first substrate, a second substrate, several optical filters and a liquid crystal layer. The first substrate is parallel to the second substrate. The liquid crystal layer is sealed between the first substrate and the second substrate. The first substrate includes several reflective portions. The second substrate includes a color filter structure. The color filter structure includes several color filter layers in at least four colors. Each of the color filter layers has an opening corresponding to one of the reflective portions. The optical filters are disposed in the openings respectively.

According to the present invention, an electronic device including a liquid crystal panel and a light source module is provided. The light source module is disposed on one side of the liquid crystal panel. The liquid crystal panel includes a first substrate, a second substrate and a liquid crystal layer. The first substrate is parallel to the second substrate. The liquid crystal layer is sealed between the first substrate and the second substrate. The first substrate includes several reflective portions. The second substrate includes a color filter structure. The color filter structure includes several color filter layers in at least four colors. Each of the color filter layers has an opening corresponding to one of the reflective portions.

The invention will become apparent from the following detailed description of the preferred but non-limiting embodiments. The following description is made with reference to the accompanying drawings.

DETAILED DESCRIPTION OF THE INVENTION

First Embodiment

Figure 1A:
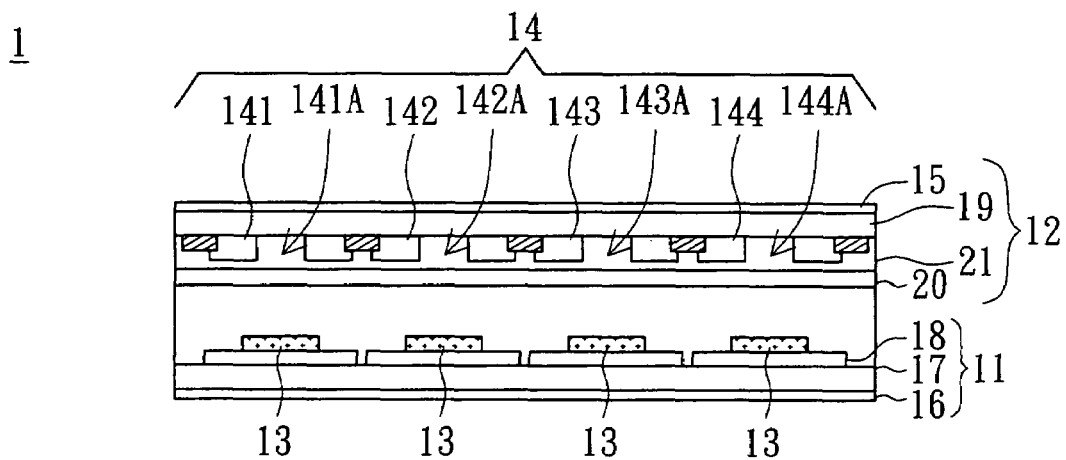
FIG. 1A is a cross-sectional view of a transreflective liquid crystal display (LCD) panel according to a first embodiment of the invention.
Figure 1B:
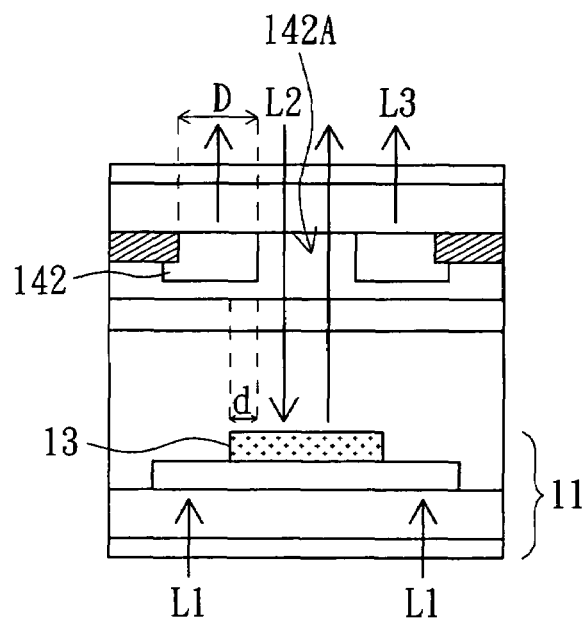
FIG. 1B is an enlarged view of a single pixel structure of the display panel in FIG. 1A.

Please refer to FIGS. 1A~1B. FIG. 1A is a cross-sectional view of a transreflective liquid crystal display (LCD) panel according to a first embodiment of the invention. FIG. 1B is an enlarged view of a single pixel structure of the display panel in FIG. 1A. As shown in FIG. 1A, the transreflective LCD panel 1 includes a first substrate 11 and a second substrate 12. The first substrate 11 and the second substrate 12 are parallel to each other, and a liquid crystal layer (not shown in drawings) is sealed between the first substrate 11 and the second substrate 12. The first substrate 11 includes several reflective portions 13, and the second substrate 12 includes a color filter structure 14. The color filter structure 14 includes several color filter layers in at least four colors. In the present embodiment, the color filter structure 14 includes at least a red color filter layer 141, a green color filter layer 142, a blue color filter layer 143 and a yellow color filter layer 144, for example. An opening is formed in each color filter layer and corresponding to one of the reflective portions 13. For example, each of the openings 141A~144A on the color filter layer is corresponding to one of the reflective portions 13.

Take the green pixel structure having the green color filter layer 142 for example. As shown in FIG. 1B, the reflective portion 13 and the green color filter layer 142 have an overlap region. A backlight source emits light L1 from the side of the first substrate 11. The area of the overlap region is smaller than that of the green filter layer 142. In the reflective mode, when the area of the overlap region is zero (d=0), the size of the opening 142A is equal to that of the reflective portion 13. Therefore, when external light L2 passes through the opening 142A and is reflected by the reflective portion 13, the displayed image is only black and white. However, when the overlap region is not equal to zero (0<d<D), the area of the reflective portion 13 is larger than that of the opening 142A, and part of the reflective portion 13 overlaps the green filter layer 142. Therefore, when external light L2 is reflected by the reflective portion 13, part of the light L3 passes through the green filter layer 142 and is propagated out (displaying green color). Therefore, even in the reflective mode, the LCD panel is able to display color images. The design of the openings of other color filter layers and the corresponding reflective portions is the same.

As shown in FIG. 1A, the display panel 1 includes an upper polarizer 15 and a lower polarizer 16 respectively disposed on external surfaces of the first substrate 11 and the second substrate 12. The first substrate 11 includes a first base plate 17 and a transparent electrode 18. The reflective portion 13 is disposed on an upper surface of the transparent electrode 18. The first substrate 11 is preferably a thin film transistor substrate. The transparent electrode 18 is a pixel electrode for example. The second substrate 12 includes a second base plate 19 and another transparent electrode 20. The color filter structure 14 is preferably a color filter. The second substrate 12 is preferably a color filter substrate. The transparent electrode 20 is a common electrode for example. At least one over-coating layer 21 is disposed on the second substrate 12 and covers color filter structure 14 for protecting the color filter structure 14. Also, the over-coating layer 21 fills the openings 141A~144A, so that the inner surface of the second substrate 12 has high flatness.

The reflective portion 13 of the first embodiment is not limited to being disposed on the surface of the transparent electrode 18. Please referring to FIG. 2A, it is a cross-sectional view showing the reflective portion 13 disposed between the transparent electrode and the first base plate.

Figure 2A:
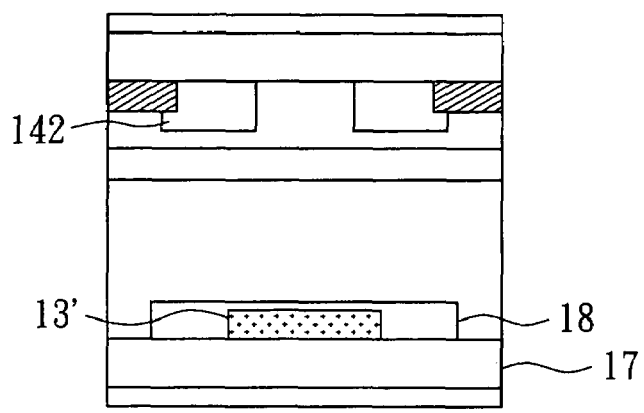
FIG. 2A is a cross-sectional view showing the reflective portion disposed between the transparent electrode and the first base plate.
Figure 2B:
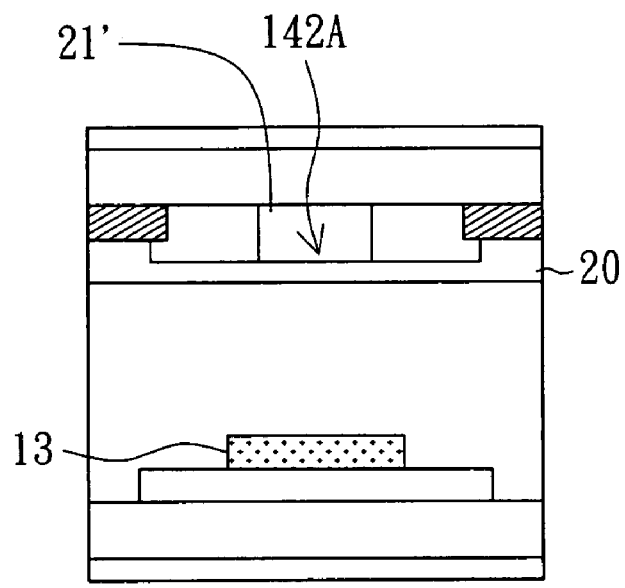
FIG. 2B is a cross-sectional view showing the over-coating layer filling the opening.
Figure 2C:
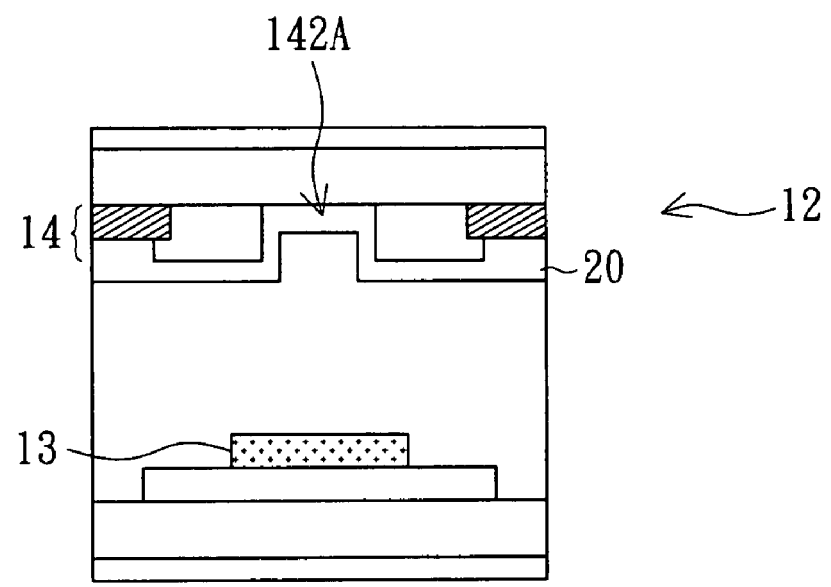
FIG. 2C is a cross-sectional view showing the second substrate in FIG. 1B without the over-coating layer.

As shown in FIG. 2A, the reflective portion 13' can be disposed on the surface of the first base plate 17, and the transparent electrode 18 completely covers the reflective portion 13'. Please refer to FIG. 2B. FIG. 2B is a cross-sectional view showing the over-coating layer only filling the opening. As shown in FIG. 2B, the display panel 1 (not marked in FIG. 2B) includes several over-coating layers 21' for filling the opening 142A. However, there can be no over-coating layer used in the display panel 1. Please refer to FIG. 2C. FIG. 2C is a cross-sectional view showing the second substrate in FIG. 1B without the over-coating layer. As shown in FIG. 2C, the transparent electrode 20 can be formed directly on the surface of the color filter structure 14 of the second substrate 12.

Although the color filter structure 14 of the present embodiment includes red, green, blue and yellow color filter layers 141~144 as an example, the colors of the color filter layers can be different in other embodiments. For example, the color filter structure 14 includes red, green, blue and cyan color filter layers. Or, the color filter structure 14 includes red, blue, cyan and yellow color filter layers.

Figure 3:
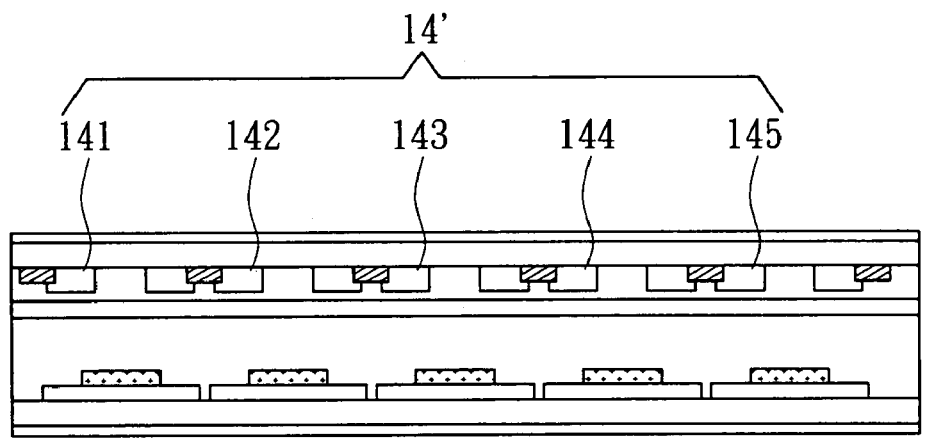
FIG. 3 is a cross-sectional view showing the color filter structure with color filter layers in five colors.
Figure 4:
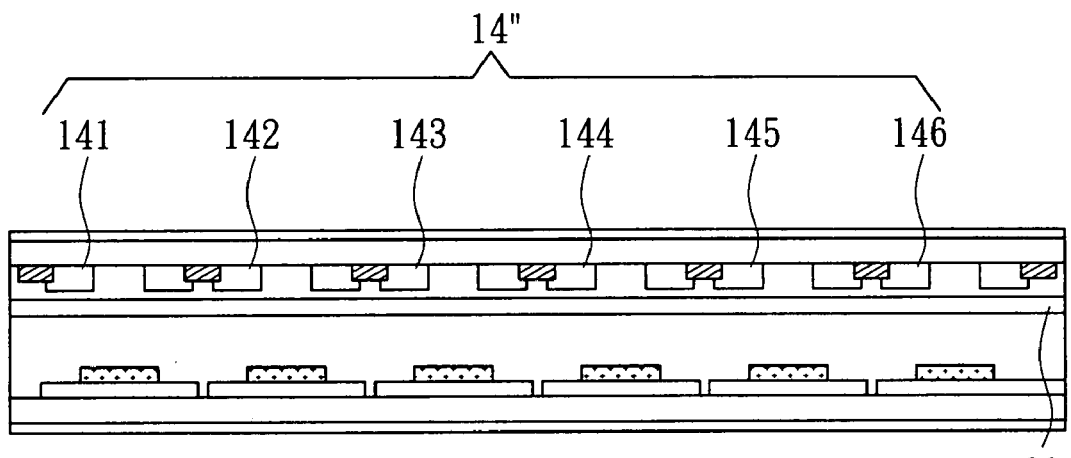
FIG. 4 is a cross-sectional view showing the color filter structure with the color filter layers in six colors.

Furthermore, except having the color filter layers in four colors, the color filter structure 14 can includes the color filter layers in five colors. Please refer to FIGS. 3~4. FIG. 3 is a cross-sectional view showing the color filter structure with color filter layers in five colors. FIG. 4 is a cross-sectional view showing the color filter structure with color filter layers in six colors. As shown in FIG. 3, the color filter structure 14' includes red, green, blue, yellow and cyan color filter layers 141~145 for example. As shown in FIG. 4, the color filter structure 14'' preferably includes red, green, blue, yellow, cyan and purple color filters 141~146. Similarly, openings are formed in the corresponding color filter layers for increasing light transmission rate. Through properly designing the size of the openings and the reflective portions, the display panel is able to display color images in the reflective mode.

Second Embodiment

Figure 5:
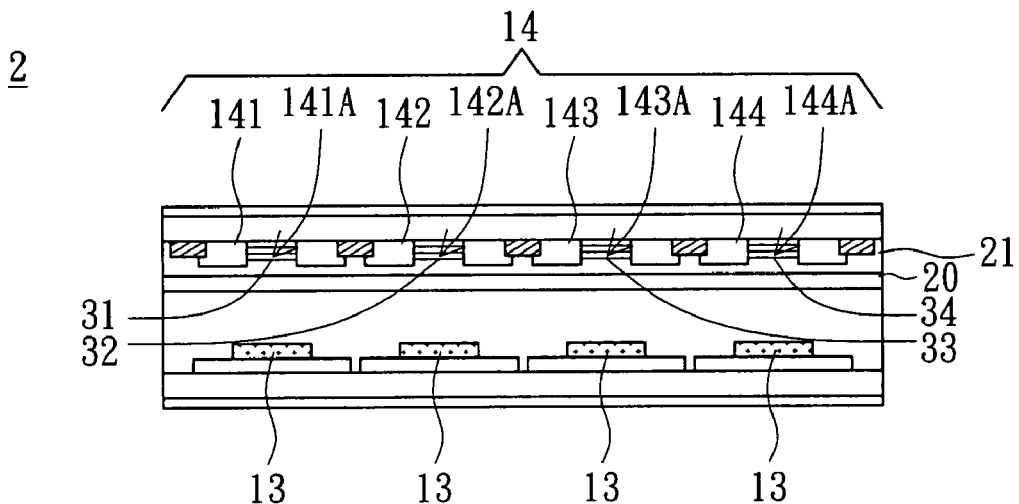
FIG. 5 is a cross-sectional view of the transreflective liquid crystal display panel according to a second embodiment of the invention.

The display panel 2 of a second embodiment and the display panel 1 of the first embodiment (as shown in FIG. 1A) are different in the design of the opening of the color filter layer. Other components using the same reference numbers are the same and not described redundantly. Please refer to FIG. 5. FIG. 5 is a cross-sectional view of the transreflective liquid crystal display panel according to the second embodiment of the invention. As shown in FIG. 5, the display panel 2 includes several optical filters 31~34 disposed in the openings 141A~144A of the color filter layers 141~144. The over-coating layer 21 is formed on the entire color filter structure 14. Each of the optical filters 31~34 is individually corresponding to one reflective portion 13 and is preferably a structure including two metal layers and a spacer layer. The spacer layer is located between the two metal layers. The light transmissions of the optical filters 31~34 are related to the material and the thickness of the metal layers and the spacer layer. As a result, after passing through the optical filters 31~34, light has different transmission spectrum. The color filter layers 141~144 are red, green, blue and yellow color filter layers respectively. Therefore, via the design of the structure, material and thickness of the optical filters 31~34, lights having the colors the same as that of the color filter layers 141~144 can pass through the optical filters 31~34. The metal layers are made of silver or alloy silver for example. The spacer layer is a dielectric layer or a conductive metal oxide layer for example.

Each of the optical filters 31~34 has two metal layers as reflective layers and the spacer layer for forming an interval between the two reflective layers. The spacer layers have different thickness according to the needs. Two parallel metal layers and one spacer layer forms a single cavity Fabry-Perot filter structure. Therefore, with the spacer layers of different thickness, several single cavity Fabry-Perot filter structures are formed. Visible light is interfered by the single cavity Fabry-Perot filter structure. For example, when the gap (that is, the thickness of the spacer layer) between the parallel reflective layers (the two metal layers) is a multiple of half of the wavelength of the incident light ($\lambda/2$), constructive interference occurs and high-resolution light having the wavelength within a narrow range is output. Therefore, through adjusting the thickness of the spacer layer, the major wavelength of the light with greatest transmission rate that is output by the single cavity Fabry-Perot filter structure is determined. As a result, the colors of the visible lights passing through the optical filters 31~34 are determined to be red, green, blue and yellow respectively.

Figure 6A:
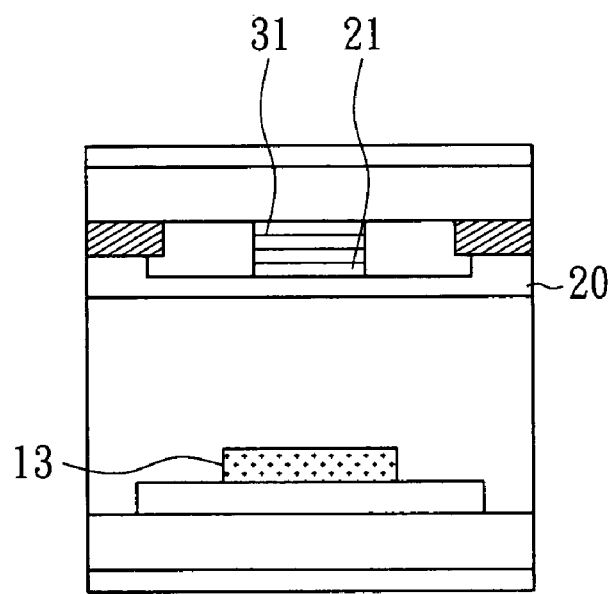
FIG. 6A is a cross-sectional view showing the over-coating layer filling the opening.
Figure 6B:
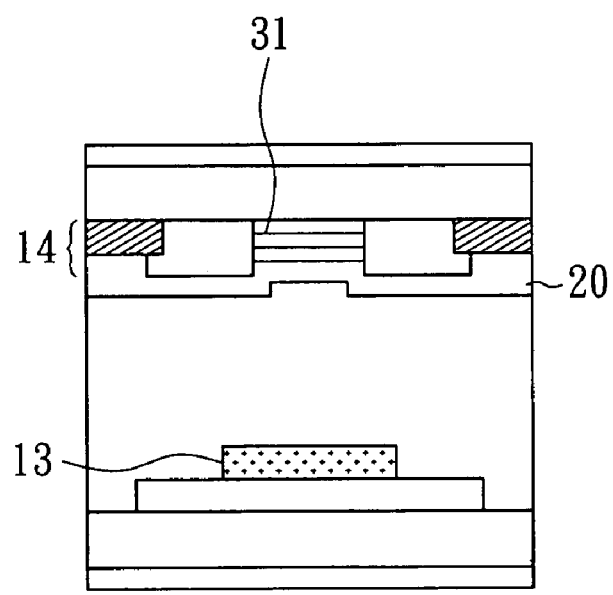
FIG. 6B is a cross-sectional view showing the second substrate without the over-coating layer.

The disposition of the over-coating layer 21 is shown in FIGS. 6A~6B. FIG. 6A is a cross-sectional view showing the over-coating layer only filling the opening. FIG. 6B is a cross-sectional view showing the second substrate without the over-coating layer. FIGS. 6A~6B illustrate only one pixel structure in the display panel as an example.

As shown in FIG. 5, although the over-coating layer 21 covers the entire color filter structure 14, the over-coating layer 21 can only fill the opening, as shown in FIG. 6A. Or, there can be no over-coating layer 21 used in the display panel, as shown in FIG. 6B. The transparent electrode 20 is directly formed on the color filter structure 14 and the optical filter 31 (including the optical filters 32~34).

Each color filter layer has different color. Through the design of the structure, thickness and material of the optical filters, the optical filters are able to change the light transmission spectrum for displaying the desired colors. When the optical filter is disposed in the opening, the opening of each color filter layer is able to color the light. As a result, the display panel 2 can display color images in the reflective mode. Moreover, the light transmission of the optical filters is good. When the optical filters are disposed in the openings, the light utilization efficiency in the reflective region can be increased for enhancing the reflection rate of the display panel 2.

Third Embodiment

Figure 7:
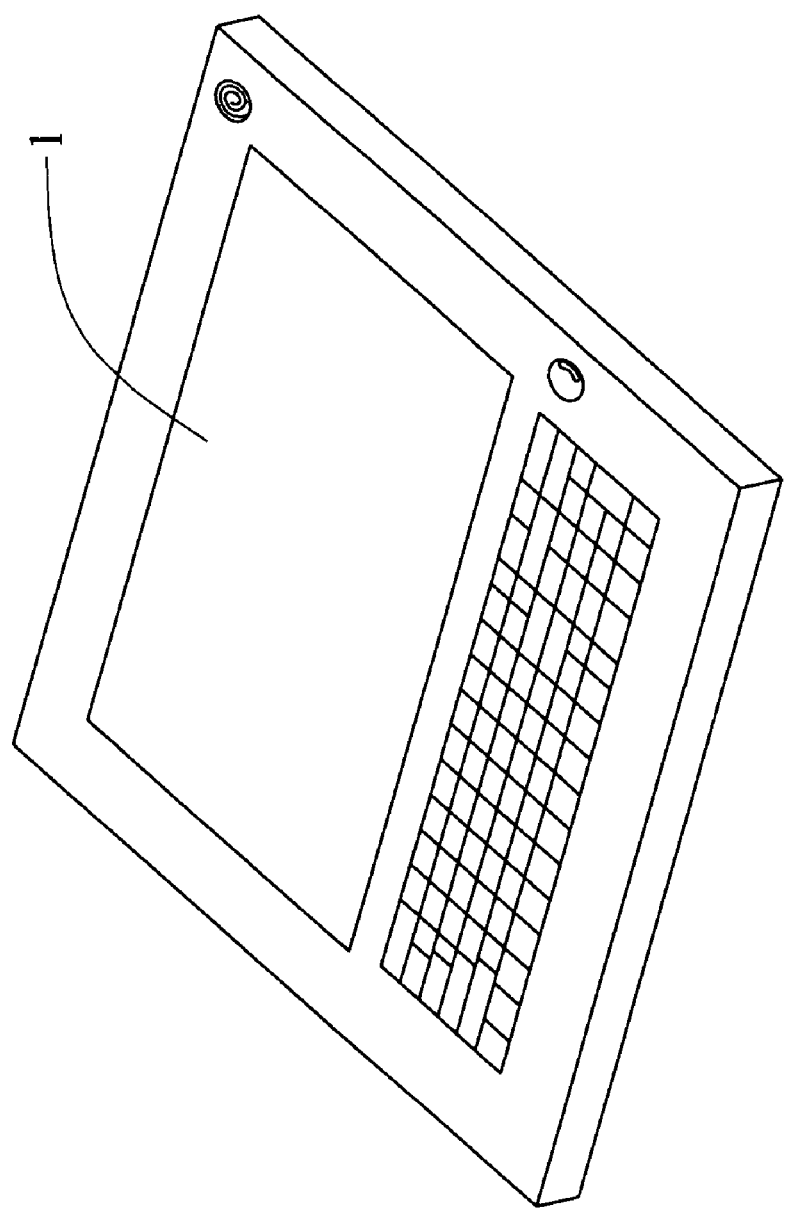
FIG. 7 is a diagram of an electronic device according to a third embodiment of the invention.

A third embodiment of the invention illustrates an electronic device using the transreflective LCD panel of the first embodiment or the second embodiment. Please referring to FIG. 7, the electronic device according to the third embodiment of the invention is illustrated in FIG. 7. As shown in FIG. 7, the electronic device 700 is for example a laptop computer, a mobile phone or another electronic device having the display panel 1. Except the display panel 1, the electronic device 700 also includes a light source module. The light source module is disposed on the side of the first substrate 11 (as shown in FIG. 1A) of the display panel 1 for providing light for the display panel 1.

In the transreflective LCD panel and the electronic device using the same according to the preferred embodiments of the invention disclosed above have the color filter structure with openings. Also, the reflective regions are disposed on the substrate correspondingly to the openings. Therefore, the light transmission of the display panel is increased in the reflective mode, and the reflection rate is increased as well. Through the appropriate setting of the sizes of the opening and the reflective region, the display panel is able to display color images in the reflective mode. Or, the optical filters are disposed in the openings for changing the light transmission spectrum to generate the same effect. Besides, the light transmission of the optical filters, is good so that the display panel has excellent color saturation both in the general mode and the reflective mode.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A transreflective liquid crystal display panel, comprising:
    a first substrate having a plurality of reflective portions;
    a second substrate parallel to the first substrate and having a color filter structure, the color filter structure having a plurality of color filter layers in at least four colors, each of the color filter layers having an opening corresponding to one of the reflective portions; and
    a liquid crystal layer sealed between the first substrate and the second substrate.

2. The display panel according to claim 1, further comprising a plurality of optical filters disposed in the openings respectively.

3. The display panel according to claim 1, wherein the second substrate further comprises at least an over-coating layer covering the color filter structure.

4. The display panel according to claim 1, wherein the second substrate further comprises a plurality of over-coating layers filling the openings.

5. The display panel according to claim 1, wherein the area of an overlap between each of the reflective portions and the corresponding color filter layer is smaller than that of the corresponding color filter layer.

6. The display panel according to claim 1, wherein the first substrate comprises a first base plate and a transparent electrode, the reflective portions are disposed on the transparent electrode.

7. The display panel according to claim 1, wherein the first substrate comprises a first base plate and a transparent electrode, and the reflective portions are disposed between the transparent electrode and the first base plate.

8. The display panel according to claim 1, wherein the color filter layers comprise at least a red color filter layer, a green color filter layer, a blue color filter layer and a yellow color filter layer.

9. The display panel according to claim 1, wherein the color filter layers comprise at least a red color filter layer, a green color filter layer, a blue color filter layer and a cyan color filter layer.

10. The display panel according to claim 1, wherein the color filter layers comprise at least a red color filter layer, a blue color filter layer, a cyan color filter layer and a yellow color filter layer.

11. The display panel according to claim 1, wherein the color filter layers comprise at least a red color filter layer, a green color filter layer, a blue color filter layer, a cyan color filter layer and a yellow color filter layer.

12. The display panel according to claim 11, wherein the color filter layers further comprise at least one purple color filter layer.

13. A transreflective liquid crystal display panel, comprising:
    a first substrate having a plurality of reflective portions;
    a second substrate parallel to the first substrate and having a color filter structure, the color filter structure having a plurality of color filter layers in at least four colors, each of the color filter layers having an opening corresponding to one of the reflective portions;
    a plurality of optical filters disposed in the openings respectively; and
    a liquid crystal layer sealed between the first substrate and the second substrate.

14. The display panel according to claim 13, wherein the second substrate further comprises at least an over-coating layer covering the color filter structure.

15. The display panel according to claim 13, wherein the second substrate further comprises a plurality of over-coating layers filling the openings.

16. The display panel according to claim 13, wherein the area of an overlap between each of the reflective portions and the corresponding color filter layer is smaller than that of the corresponding color filter layer.

17. The display panel according to claim 13, wherein the first substrate comprises a first base plate and a transparent electrode, the reflective portions disposed on the transparent electrode.

18. The display panel according to claim 13, wherein the first substrate comprises a first base plate and a transparent electrode, and the reflective portions are disposed between the transparent electrode and the first base plate.

19. An electronic device, comprising:
   a liquid crystal panel including:
      a first substrate having a plurality of reflective portions;
      a second substrate parallel to the first substrate and having a color filter structure, the color filter structure having a plurality of color filter layers in at least four colors, each of the color filter layers having an opening corresponding to one of the reflective portions; and
      a liquid crystal layer sealed between the first substrate and the second substrate; and
   a light source module disposed on one side of the liquid crystal panel.

20. The electronic device according to claim 19, wherein the liquid crystal panel further comprises a plurality of optical filters disposed in the openings respectively.

21. The electronic device according to claim 19, wherein the second substrate further comprises at least a over-coating layer covering the color filter structure.

22. The electronic device according to claim 19, wherein the second substrate further comprises a plurality of over-coating layers filling the openings.

23. The electronic device according to claim 19, wherein the area of an overlap between each of the reflective portions and the corresponding color filter layer is smaller than that of the corresponding color filter layer.

24. The electronic device according to claim 19, wherein the first substrate comprises a first base plate and a transparent electrode, the reflective portions disposed on the transparent electrode.

25. The electronic device according to claim 19, wherein the first substrate comprises a first base plate and a transparent electrode, and the reflective portions are disposed between the transparent electrode and the first base plate.

* * * * *